US012131368B2

(12) United States Patent
Depew

(10) Patent No.: US 12,131,368 B2
(45) Date of Patent: Oct. 29, 2024

(54) ELECTRONIC DEVICE FOR RE-ORDERING ITEMS

(71) Applicant: Amazon Technologies, Inc., Seattle, WA (US)

(72) Inventor: John Mathew Depew, Sunnyvale, CA (US)

(73) Assignee: Amazon Technologies, Inc., Seattle, WA (US)

(*) Notice: Subject to any disclaimer, the term of this patent is extended or adjusted under 35 U.S.C. 154(b) by 907 days.

(21) Appl. No.: 16/530,878

(22) Filed: Aug. 2, 2019

(65) Prior Publication Data

US 2020/0065883 A1 Feb. 27, 2020

Related U.S. Application Data

(62) Division of application No. 14/306,012, filed on Jun. 16, 2014, now Pat. No. 10,373,234.

(51) Int. Cl.
*G06Q 30/00* (2023.01)
*G06Q 30/0601* (2023.01)

(52) U.S. Cl.
CPC .............................. *G06Q 30/0633* (2013.01)

(58) Field of Classification Search
CPC .................................................. G06Q 30/0633

(Continued)

(56) References Cited

U.S. PATENT DOCUMENTS

2006/0151529 A1 7/2006 Crisp, III
2010/0070217 A1* 3/2010 Shimada ........... H02J 13/00016
702/62

(Continued)

FOREIGN PATENT DOCUMENTS

WO WO2010103332 A1 9/2010

OTHER PUBLICATIONS

Blackford, J. (1999). The future of computing : For 500,000 years technology has advanced while people remained the same. in the next millennium, the human race plays catch-up. Computer Shopper, 19(12), 319. Retrieved from https:// dialog.proquest.com/ professional/docview/668855858?accountid=142257 (Year: 1999).*

(Continued)

*Primary Examiner* — Anand Loharikar
(74) *Attorney, Agent, or Firm* — Lee & Hayes, P.C.

(57) ABSTRACT

In some cases, a method may include receiving electricity usage data from a re-ordering device and determining usage information for an appliance that is electrically connected to the re-ordering device based on the electricity usage data. The method may also include determining, based on the usage information and order history information for a customer, an estimated remaining quantity of an item that is associated with an appliance type of the appliance. The method further includes comparing the estimated remaining quantity of the item to a threshold associated with the item. In response to determining that the threshold associated with the item is satisfied, the method includes decrementing the estimated remaining quantity of the item. In response to determining that the threshold associated with the item is not satisfied, the method includes generating order data for automated re-ordering of the item for delivery to the customer.

20 Claims, 9 Drawing Sheets

(58) Field of Classification Search
USPC .................................. 324/103; 705/26.1–27.2
See application file for complete search history.

(56) References Cited

U.S. PATENT DOCUMENTS

| | | |
|---|---|---|
| 2010/0079132 A1 | 4/2010 | Steele et al. |
| 2011/0191198 A1* | 8/2011 | Rise .................. G06Q 30/0601 705/26.1 |
| 2013/0041605 A1 | 2/2013 | Ting et al. |
| 2013/0127248 A1 | 5/2013 | Lai |
| 2014/0136348 A1 | 5/2014 | Carroll et al. |
| 2015/0363866 A1 | 12/2015 | Depew |

OTHER PUBLICATIONS

Blackford, J., "The Future of Computing : For 500,000 years technology has advanced while people remained the same. In the next millennium, the human race plays catch-up," Computer Shopper, 19(12), 319, retrieved from <<https://dialog.proquest.com/professional/docview/668855858?accountid= 142257>>, Mar. 4, 2019, 8 pages.

Office Action for U.S. Appl. No. 14/306,012, mailed on Oct. 4, 2017, Depew, "Electronic Device For Re-Ordering Items", 30 pages.

Office Action for U.S. Appl. No. 14/306,012, mailed on Apr. 21, 2017, Depew, "Electronic Device For Re-Ordering Items", 22 pages.

Office Action for U.S. Appl. No. 14/306,012, mailed on Aug. 13, 2018, Depew, "Electronic Device For Re-Ordering Items", 20 pages.

"Kill A Watt", P3 International, retrieved on Jun. 16, 2014 at <<http://www.p3international.com/products/p4400.html>>, 1 page.

PCT Search Report and Written Opinion mailed Sep. 8, 2015 for PCT Application No. PCT/US15/36018, 12 pages.

* cited by examiner

ELECTRONIC DEVICE FOR RE-ORDERING ITEMS

CROSS-REFERENCE TO RELATED APPLICATIONS

This application is a divisional of, and claims priority to, co-pending, commonly-owned U.S. patent application Ser. No. 14/306,012 filed on Jun. 16, 2014, which is incorporated herein in its entirety by reference.

BACKGROUND

Keeping track of ongoing shopping needs may be challenging. For example, shoppers may forget to purchase items and may not realize that they forgot to purchase certain items until after returning from a shopping trip. Further, some shoppers may consider shopping for particular types of household items (e.g., laundry detergent) as "drudgery shopping" and may prefer to focus on the "fun part" of shopping, such as shopping for ingredients for a new recipe.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
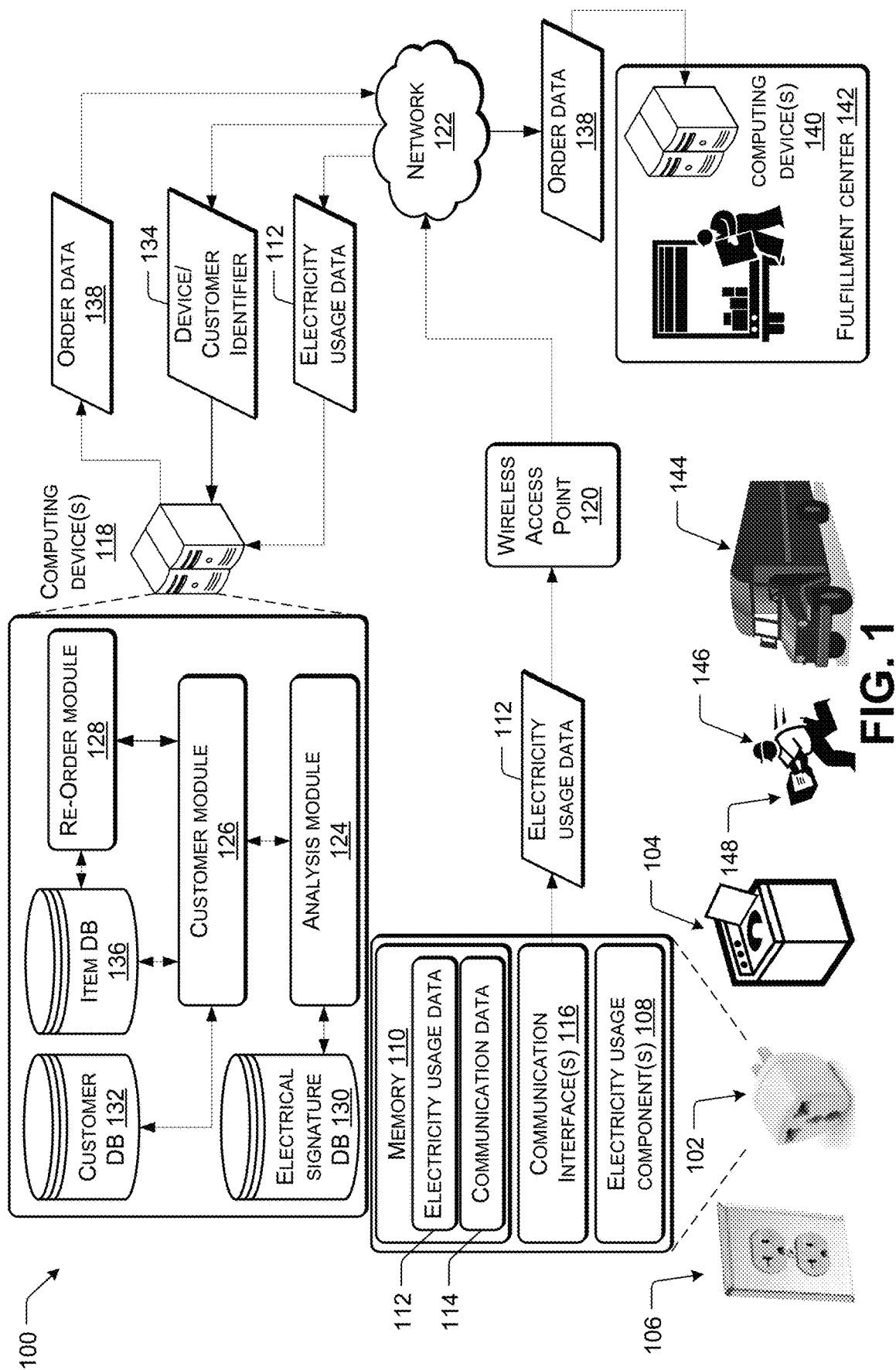
FIG. 1 illustrates an example architecture for a delivery service that receives electricity usage data from an electronic device (e.g., a "re-ordering device") that monitors electricity usage of an appliance of a customer, according to some implementations. In some cases, the delivery service may determine one or more items to automatically re-order and schedule for delivery to the customer based on the electricity usage data.

This disclosure describes, in part, techniques and arrangements for determining whether to automatically re-order and schedule delivery of one or more items to a customer based on electricity usage data received from a re-ordering device that is located at a customer premises and that monitors electricity usage for a particular appliance.

In some embodiments, the re-ordering device of the present disclosure may be a separate device installed between an electrical outlet and an appliance (e.g., a washing machine). The re-ordering device may monitor electricity usage by the appliance over time and may store electricity usage data in a memory. In some cases, the electricity usage data may be sent at regular intervals to a remote computing device (e.g., associated with a delivery service) via the customer's Wi-Fi (or similar wireless connection) and the Internet, for further processing.

Upon receipt of the data by the remote computing device, one or more algorithms may be used to process the electricity usage data to determine an appliance type (e.g., a washing machine, a dryer, a dish washer, an oven, etc.) and to estimate the user's consumption of associated products. To illustrate, in the case of a washing machine, laundry detergent may represent a product that may be directly associated with use of the washing machine. Examples complementary products may include fabric softener for use in the washing machine itself or dryer sheets for use in a separate appliance that is associated with use of the washing machine (e.g., a dryer). As an illustrative, non-limiting example, electricity usage data indicative of a single use of the washing machine may represent an estimated consumption of an amount of laundry detergent that is associated with one load of laundry. Further, as a person typically uses a dryer after using the washing machine, the single use of the washing machine may serve as a proxy indicator of consumption of one dryer sheet. As another illustrative example, when the appliance is a single-serving coffee maker that uses disposable coffee cups, electricity usage data indicative of a single use of the coffee maker may represent an estimated consumption of one disposable coffee cup. Further, as some people use coffee creamer and/or sweetener to flavor their coffee, the single use of the coffee maker may serve as a proxy indicator of consumption of one serving of creamer and/or one serving of sugar or another sweetener.

In some cases, past ordering history information for the customer along with calculated consumption data may indicate that particular product(s) are to be flagged for reorder. In some embodiments, the product(s) may be automatically scheduled for delivery to the customer's home or business. Alternatively, suggestions may be placed in the customer's virtual shopping cart or notifications may be sent to the customer, among other alternatives. Thus, the present disclosure describes an electronic feedback system that may initiate product re-ordering without direct user interaction.

Referring to FIG. 1, an example framework 100 for a delivery service that receives electricity usage data from a re-ordering device 102 located at a home or business of a customer is illustrated. In the particular embodiment illustrated in FIG. 1, the re-ordering device 102 is a separate device that is installed between an appliance 104 (e.g., a washing machine in the example illustrated) and an electrical outlet 106. In alternative embodiments, one or more components of the re-ordering device 102 may be included in the appliance 104, a power cord of the appliance 104, or the electrical outlet 106 itself (see e.g., FIG. 5), among other alternatives. As an illustrative, non-limiting example, the power cord of the appliance 104 may include a memory to store information that identifies an appliance type of the appliance 104.

In the illustrative example of FIG. 1, the re-ordering device 102 includes one or more electricity usage components 108 and a memory 110 to store at least electricity usage data 112 and communication data 114. The re-ordering device 102 may correspond to a wide variety of electronic devices. In some embodiments, the re-ordering device 102 may be a computing device that includes one or more processors (e.g., the microcontroller 312 of FIG. 3), and the memory 110 may contain software applications executed by the microcontroller. Software of the re-ordering device 102 may include components for establishing communications over wireless or wired communication networks or directly with other computing devices.

The re-ordering device 102 further includes one or more communication interfaces 116 to communicate with one or more computing devices 118 associated with a delivery service. The one or more computing devices 118 of FIG. 1 include electricity usage processing capabilities as well as customer and item identification processing capabilities. The one or more computing devices 118 can include several devices physically or logically grouped together. In multi-device implementations, the various devices may communicate via an internal communication network, such as a corporate network configured as a local area network ("LAN") or a wide area network ("WAN"). In some cases, the devices may communicate over an external network, such as the Internet, or a combination of internal and external networks. In further embodiments, the features and services may be provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the one or more communication interfaces 116 of the re-ordering device 102 may support at least a wireless connection to various networks, such as a WiFi network. Further, in some cases, the one or more communication interfaces 116 may support both wired and wireless connections to various networks, such as cellular networks, radio, WiFi networks, short-range or near-field networks (e.g., Bluetooth®), infrared signals, local area networks, wide area networks, the Internet, and so forth.

In some cases, the re-ordering device 102 may have access to the Internet via a WiFi connection, or via a cellular telephone network (e.g., a Long Term Evolution or LTE network). In the example of FIG. 1, the re-ordering device 102 may have access to the Internet via a wireless connection with a wireless access point (WAP) 120, which may be connected to a network 122 (e.g., the Internet) via a wired connection (e.g., via a cable modem or a digital subscriber line (DSL) modem, among other alternatives).

The network 122 may be a publicly accessible network of linked networks, possibly operated by various distinct parties, such as the Internet. In other embodiments, the network 122 may include a private network, personal area network ("PAN"), LAN, WAN, cable network, satellite network, etc. or some combination thereof, each with access to and/or from the Internet. For example, the one or more remote computing devices 118 may be located within a single data center, and may communicate via a private network as described above.

The re-ordering device 102 may be configured to communicate the electricity usage data 112 to the one or more remote computing devices 118. Further, the re-ordering device 102 may be configured to communicate one or more identifiers (e.g., at least one of a customer account identifier or a device identifier) to the one or more remote computing devices 118. While not shown in the example of FIG. 1, in some cases the identifier(s) may be stored in the memory 110 (see e.g., FIG. 3).

In the embodiment illustrated in FIG. 1, the one or more computing devices 118 include an analysis module 124, a customer module 126, and a re-order module 128. As described further below with respect to FIG. 2, the analysis module 124 may be configured to determine an appliance type of the appliance 104 based on a comparison of the electricity usage data 112 received from the re-ordering device 102 to a plurality of signatures stored in an electrical signature database 130.

The customer module 126 may be configured to identify a customer associated with the re-ordering device 102 by querying a customer database 132 based on device/customer data received from the re-ordering device 102. The customer database 132 may also contain information with respect to purchase history for various items for the customer. The customer module 126 may be further configured to query an item database 136 to determine information associated with one or more items that may be appropriate for automatic re-order based on the customer's purchase history and the identified appliance 104. The re-order module 128 may determine whether to re-order the item(s) and may communicated associated order data 138 to one or more computing devices 140 associated with an order fulfillment center 142 (e.g., a warehouse). FIG. 1 illustrates that a delivery vehicle 144 may travel from the fulfillment center 142 to a home or business of the customer, and a delivery driver 146 may deliver the automatically re-ordered item(s) 148.

To illustrate, as described further below with respect to FIG. 2, the analysis module 124 may identify the appliance 104 as a washing machine based on a comparison of the electricity usage data 112 received from the re-ordering device 102 and the signatures stored in the electrical signature database 130. The customer module 126 may query the customer database 132 to determine order history information for the customer and may query the item database 136 to determine information associated with one or more items that are applicable to a washing machine appliance type. The re-order module 128 may determine, based on the order history information, whether to automatically re-order one or more of the items.

Figure 2:
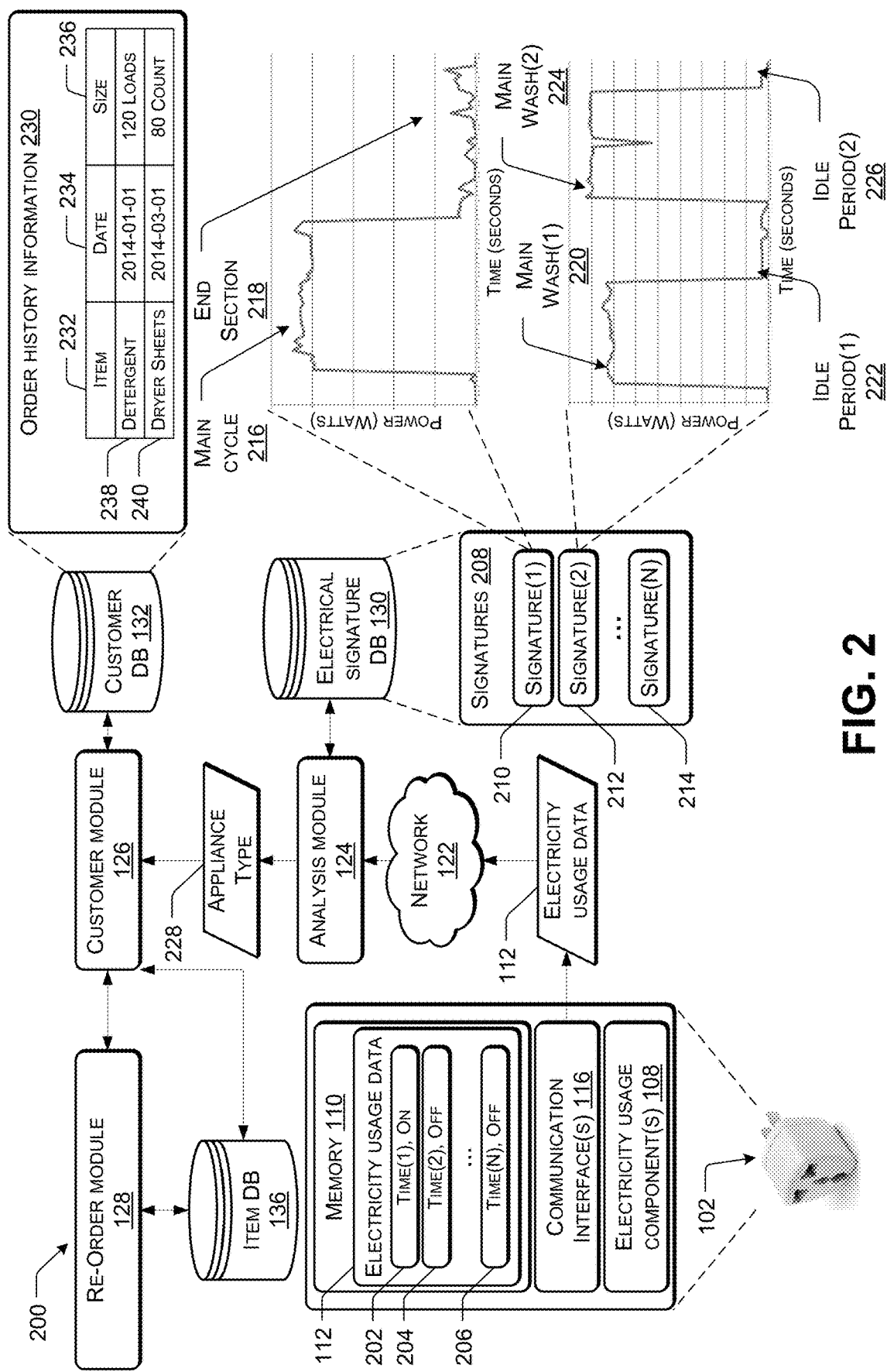
FIG. 2 is a block diagram that illustrates select components of an example re-ordering device as well as select components of computing device(s) of a delivery service for determining item(s) to automatically re-order and schedule for delivery to the customer based on electricity usage data, according to some implementations.

Referring to FIG. 2, an example framework for communicating electricity usage data from the re-ordering device 102 to a delivery service for analysis is illustrated and generally designated 200.

FIG. 2 illustrates that the electricity usage data 112 stored in the memory 110 of the re-ordering device 102 may include first electricity usage data 202 associated with a first time (identified as "Time(1), On" in FIG. 1), second electricity usage data 204 (identified as "Time(2), Off" in FIG. 1), up to an Nth electricity usage data 206 (identified as "Time(N), On" in FIG. 1).

The re-ordering device 102 may communicate the electricity usage data 112 to the analysis module 124 via the network 122. The analysis module 124 may access the electrical signature database 130 for comparison of the electricity usage data 112 to a plurality of signatures 208. In the example illustrated in FIG. 2, the plurality of signatures 208 includes a first signature 210 (identified as "Signature(1)" in FIG. 2), a second signature 212 (identified as "Signature(2)" in FIG. 2), up to an Nth signature 214 (identified as "Signature(N)" in FIG. 2).

In the example illustrated in FIG. 2, the first signature 210 represents an illustrative, non-limiting example of an electrical signature that may be associated with a washing machine. For example, the graph associated with the first signature 210 identifies power consumption (e.g., in Watts) on the Y-axis and time (e.g., in seconds) on the X-axis. The graph associated with the first signature 210 illustrates that this type of appliance has two distinct sections: a main cycle 216 and an end section 218. For example, the main cycle 216 may be between 10 and 30 minutes in duration, with a substantially constant power draw of about 2000 W. The end section 218 may be longer in duration, with an alternating power draw of either about 200 W or 0 W.

By contrast, the second signature 212 represents an illustrative, non-limiting example of an electrical signature associated with a dishwasher. For example, the graph associated with the second signature 212 illustrates that this type of appliance has four distinct sections: a first main wash 220 (identified as "Main Wash(1)" in FIG. 2), followed by a first idle period 222 (identified as "Idle Period(1)" in FIG. 2), a second main wash 224 (identified as "Main Wash(2)" in FIG. 2), followed by a second idle period 226 (identified as "Idle Period(2)" in FIG. 2). A duration of the first main wash 220 may be about 25 minutes, while a duration of the second main wash 224 may be about 30 minutes, during both of which a substantially constant power of about 1600 W is drawn. The first idle period 222 may have a duration of about 20 minutes, during which a substantially constant power of 50 W is drawn. The second idle period 226 may have a shorter duration of about 5 minutes, during which a substantially constant power of 50W is drawn, gradually tapering to 0W.

By comparing the electrical usage data 112 received from the re-ordering device 102 to the plurality of signatures 208, the analysis module 124 may determine an appliance type 228. For example, the analysis module 124 may determine that the electrical usage data 112 substantially matches the first signature 210 and determine that the appliance type 228 is a washing machine (as illustrated in the example of FIG. 1).

The analysis module 124 may provide the appliance type 228 to the customer module 126. The customer module 126 may access the customer database 132 to determine order history information 230 associated with the customer. In the illustrative example of FIG. 2, the order history information 230 is simplified to illustrate at least one item 232 that is associated with the identified appliance type 228. Further, the order history information 230 may include a date 234 (or other time) that a particular item was most recently ordered by the customer, along with other item information, such as a size 236, that may be useful in estimating whether a re-order is appropriate for the particular item.

As an illustrative example, when the appliance type 228 includes a washing machine, a first item may include laundry detergent 238. FIG. 2 further illustrates an example in which another item may be associated with the customer doing the laundry but may not be used by the washing machine itself. To illustrate, the second item shown in the example of FIG. 2 includes dryer sheets, which may not be used by a washing machine but rather by a dryer.

Figure 3:
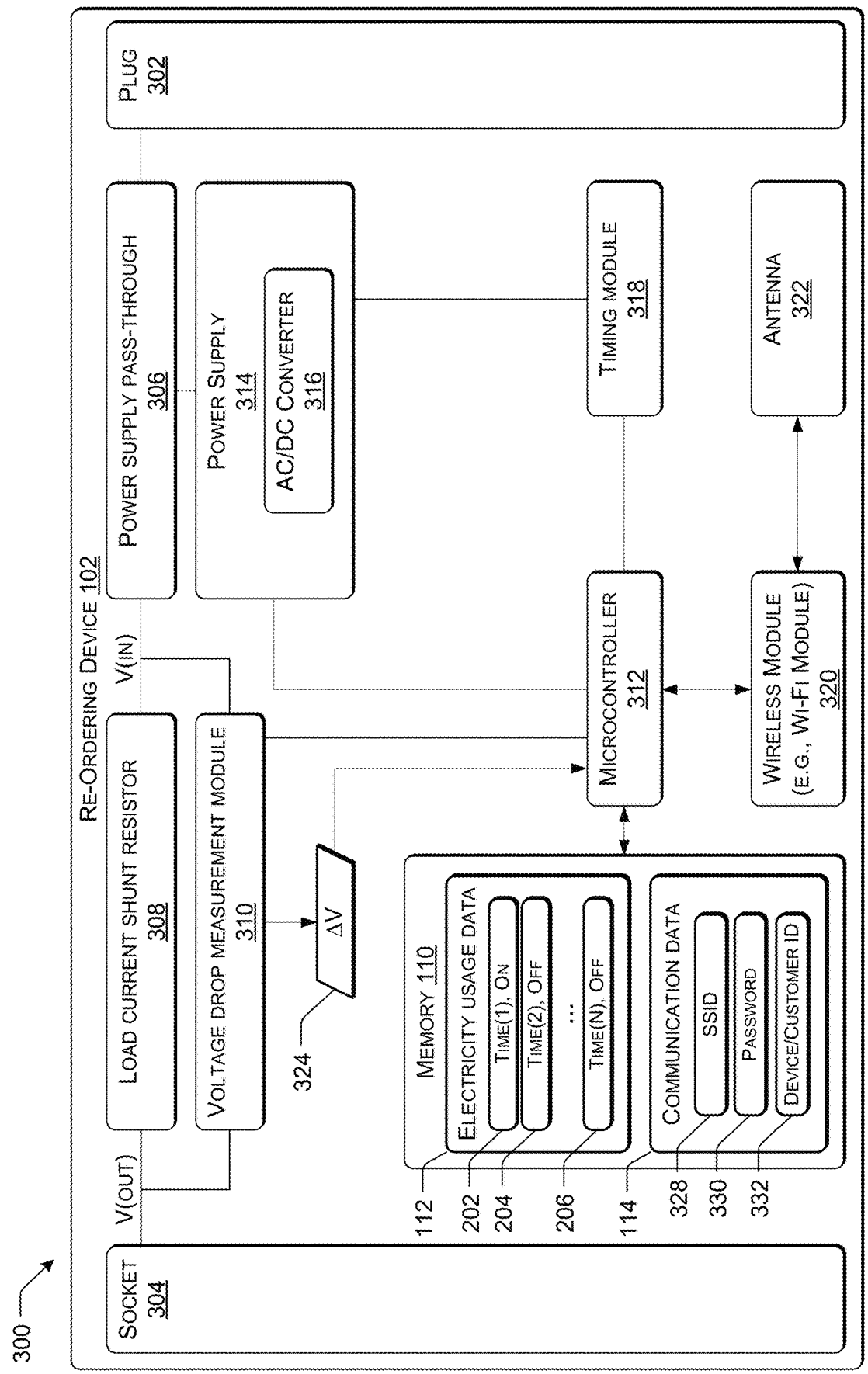
FIG. 3 is a block diagram that illustrates select components of one example of a re-ordering device, according to some implementations.

Referring to FIG. 3, an exploded view of select components of the example re-ordering device 102 of FIGS. 1 and 2 is illustrated and generally designated 300.

In the example illustrated in FIG. 3, the re-ordering device 102 includes a plug 302, a socket 304, and a power supply pass-through 306 to provide power to one or more internal components of the re-ordering device 102. Alternatively, a battery or other power source may be used to provide power to the internal components of the re-ordering device.

In the particular embodiment illustrated, the re-ordering device 102 includes a load current shunt resistor 308 disposed between the plug 302 and the socket 304. A voltage drop measurement module 310 is electrically coupled to an input to the load current shunt resistor 308 in order to measure an input voltage (identified as "V(in)" in FIG. 3) and to an output of the load current shunt resistor 308 in order to measure an output voltage (identified as "V(out)" in FIG. 3). It will be appreciated that the load current shunt resistor 308 is merely one illustrative example of measuring a current and/or a voltage. A shunt resistor is based on Ohm's law that an amount of voltage generated across the shunt is directly proportional to an amount of current that is flowing through the load. In alternative embodiments, a current transformer or a Hall effect sensor may be employed, with both alternatives based on the fact that for a given current flow, a proportional magnetic field is produced in accordance with Ampere's law.

The re-ordering device 102 also includes a microcontroller 312. In a particular embodiment, the microcontroller 312 may include an embedded processor with embedded memory (e.g., a 1 MB Flash memory) and static random-access memory (SRAM), such as a 128 KB static SRAM. In the example illustrated, a power supply 314 receives power via the power supply pass-through 306 and includes an alternating current (AC) to direct current (DC) converter 316 in order to provide direct current (e.g., 3.3 V) to the microcontroller 312. Further, the microcontroller 312 is electrically coupled to the voltage drop measurement module 310, a timing module 318, and a wireless module 320 (e.g., a Wi-Fi module) which is electrically coupled to an antenna 322. FIG. 3 further illustrates that the microcontroller 312 may be communicatively coupled to the memory 110 (e.g., a serial flash memory) and a wireless module 320 (e.g., a Wi-Fi module).

In a particular embodiment, the wireless module 320 may include hardware, such as an Institute of Electrical and Electronics Engineers (IEEE) 802.11b/g/n single band (e.g., 2.4 GHz) radio that may communicate via a single antenna (e.g., the antenna 322). In some cases, the wireless module 320 may have a maximum transmission (Tx) power of about +19 dBm (CCK) for 802.11b communications, a maximum Tx power of about +18 dBm (11g OFDM) for 802.11g communications, and a maximum Tx power of about +18 dBm (11n MCSO) for 802.11n communications.

The wireless module 320 may be activated to establish a wireless connection (e.g., with a wireless access point (WAP) of the user). In some cases, the microcontroller 312 may be configured to activate the wireless module 320 in order to establish a wireless connection with a particular WAP based on connection information that may be stored in the memory 110. For example, a service set identifier (SSID) 328 and an (optional) password 330 associated with the particular WAP (e.g., the WAP 120 in FIG. 1) may be stored in the memory 110 and may be used to establish the wireless connection. After establishing the wireless connection, information stored in the memory 110 (e.g., at least a portion of the electrical usage data 112, a device/customer identifier 332, or combination thereof) may be communicated to a delivery service for processing.

The voltage drop measurement module 310 is configured to measure a voltage drop 324 (illustrated as "ΔV" in FIG. 3) across the load current shunt resistor 308 that is associated with electricity usage by an appliance (not shown) that draws power via the socket 304. The timing module 318 is configured to provide a timing signal to the microcontroller 312 in order for the microcontroller 312 to determine a particular period of time over which the voltage drop 324 occurs.

The microcontroller 312 is configured to store select portions of the measured electrical consumption information in the memory 110 as the electricity usage data 112. To illustrate, in the particular embodiment illustrated in FIG. 3, the microcontroller 312 may limit the amount of data stored in the memory 110 by storing the first electricity usage data 202 in response to a first measured voltage drop 324 (e.g., 120V) in association with a first time that may represent a time when the appliance is turned on. Further, the microcontroller 312 may limit the amount of data stored in the memory 110 by storing the second electricity usage data 204 in response to a second measured voltage drop 324 (e.g., 0V) in association with a second time that may represent a time when the appliance is turned off. In alternative embodiments, the microcontroller 312 may record the electricity usage data 112 at various levels of granularity.

Figure 4:
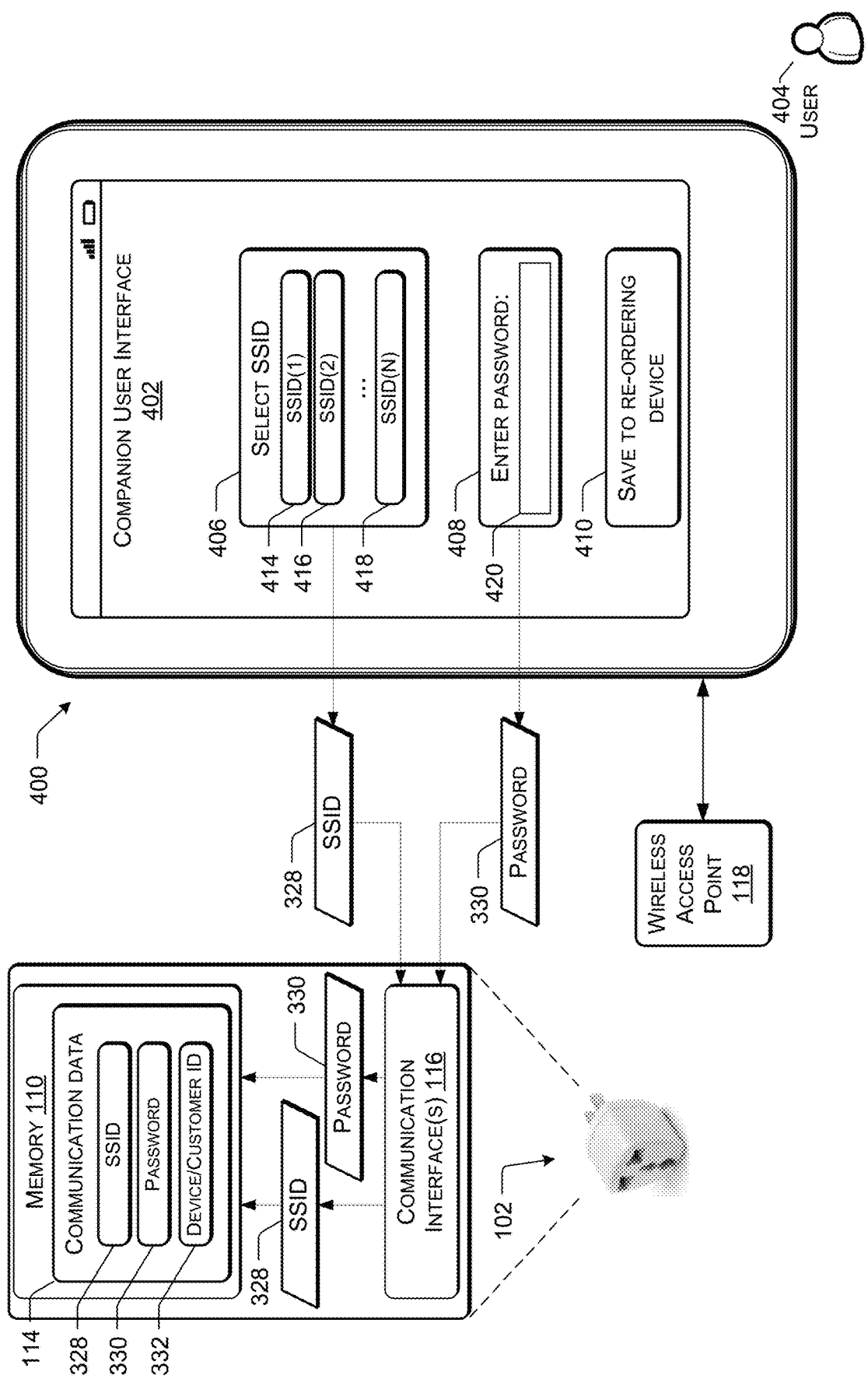
FIG. 4 illustrates an example of a companion user interface presented via a display of an electronic device that may allow a customer to provide communication data for storage in a memory of a re-ordering device, according to some implementations.

FIGS. 1-3 illustrate a particular embodiment of a re-ordering device 102 that may not include an input device for a customer to identify the communication data 114. Accordingly, referring to FIG. 4, another electronic device 400 (i.e., an electronic device other than the re-ordering device 102) may allow the customer to provide the communication data 114 for storage in the memory 110 of the re-ordering device 102. FIG. 4 illustrates an example of a companion user interface 402 that may be presented on a display of the other electronic device 400 (e.g., a tablet computing device or a smartphone).

In the example of FIG. 4, the companion user interface 402 includes a first area 406 to provide an SSID, a second area 408 to enter a password (if applicable), and a selectable option 410 to save information to the re-ordering device 102. In some cases, the first area 406 may include a list of selectable SSIDs that may be able to provide a wireless connection. In the example of FIG. 4, the list of SSIDs includes a first SSID 414 (identified as "SSID(1)"), a second SSID 416 (identified as "SSID(2)"), up to an Nth SSID 418 (identified as "SSID(N)"). The customer may select the SSID 328 associated with the customer's WAP 116 (e.g., via a touchscreen or other input device). Further, the customer may provide the (optional) password 330 associated with the customer's WAP 116 via a text input box 420.

In response to selection of the selectable option 410 to save the information, the electronic device 400 may wirelessly communicate the SSID 328 and the (optional) password 330 to the re-ordering device 102 (e.g., via a Wi-Fi protocol). The re-ordering device 102 may store the SSID 328 and the (optional) password 330 in the memory 110 in order to allow the re-ordering device to establish a wireless connection with the customer's WAP 116.

Figure 5:
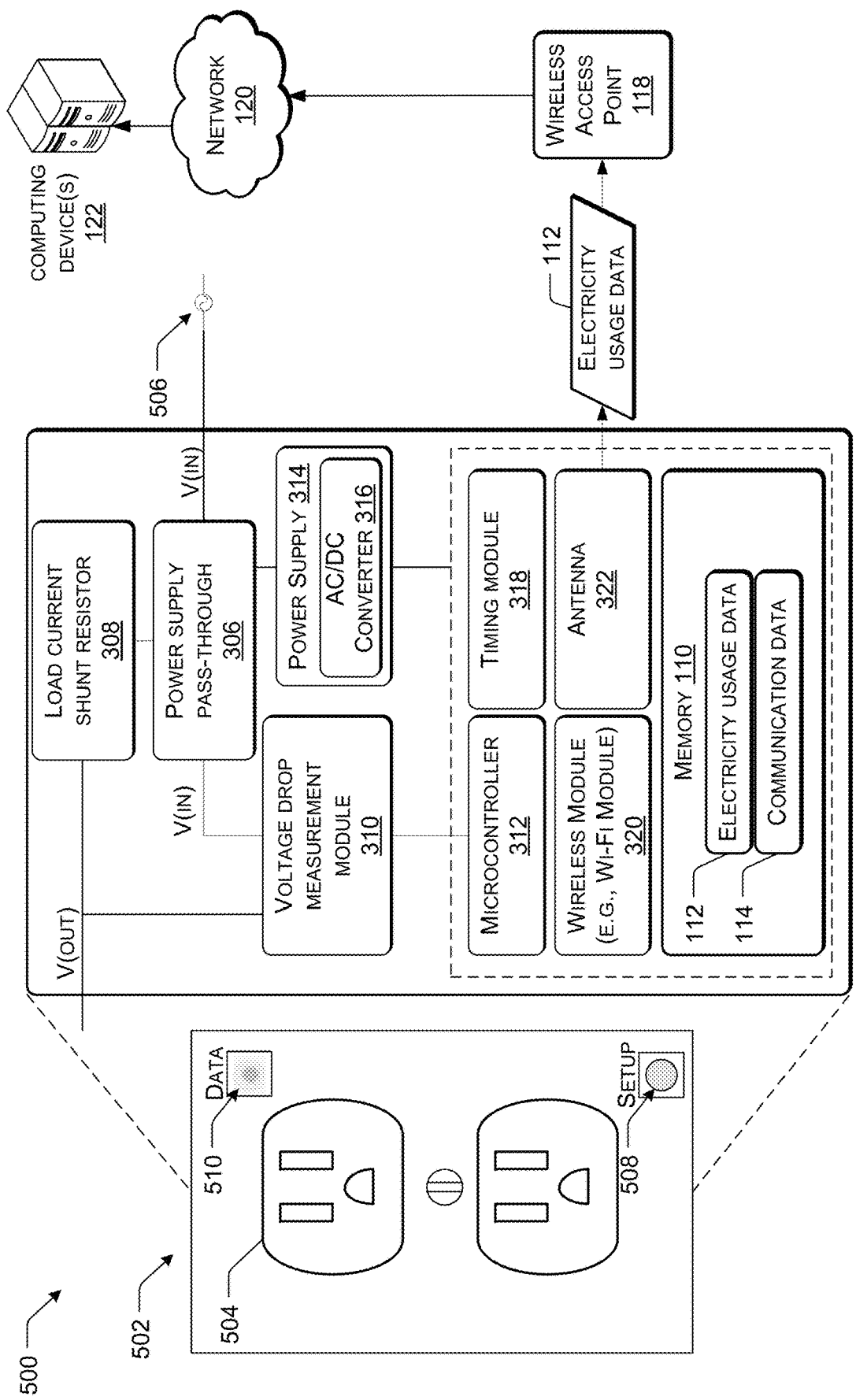
FIG. 5 illustrates select components of another example of a re-ordering device, according to some implementations.

Referring to FIG. 5, an alternative embodiment of a re-ordering device 502 in which select components described above may be built into a power outlet that includes a socket 504 to receive a power cord from an appliance and that is directly connected to an alternating current (AC) source 506 (e.g., that may provide e.g., a 120V or 240V voltage input). FIG. 5 further illustrates an example in which the re-ordering device 502 may include a selectable button 508 to enter a wireless configuration mode. FIG. 5 further illustrates a particular example in which the re-ordering device 502 may include a light 510 or other visual or audible feedback mechanism that may provide information to the customer regarding e.g., data being sent and/or received. That is, while FIGS. 1-5 illustrate data (e.g., the electricity usage data 112) being sent via the antenna 322 to the wireless access point 118, in some cases the antenna 322 may be configured to receive data and may initiate the illumination of the light 510 accordingly.

Figure 6:
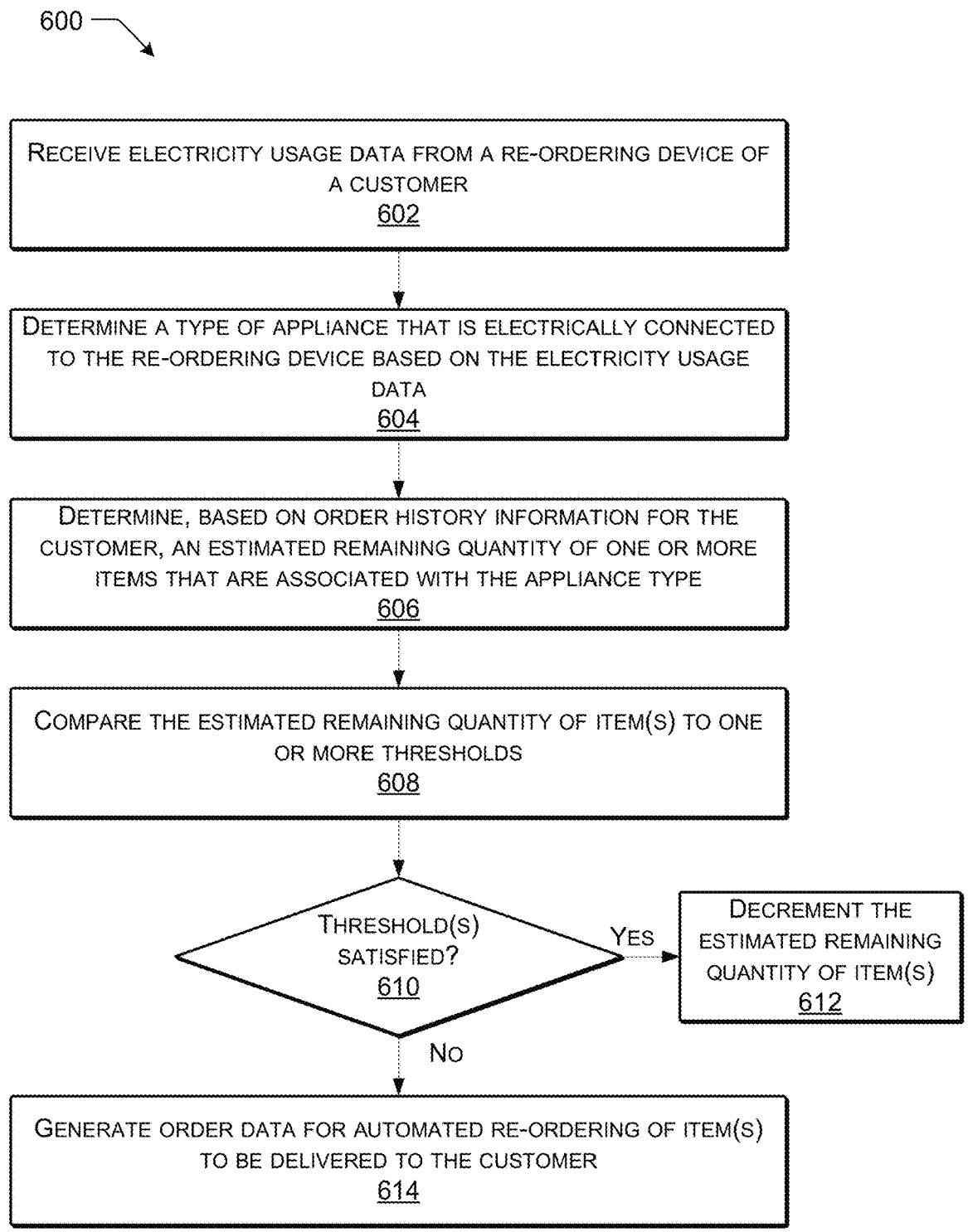
FIG. 6 illustrates an example process for determining whether to automatically re-order one or more items to be delivered to a customer based on electricity usage data received from a re-ordering device, according to some implementations.

FIG. 6 illustrates an example process 600 for determining whether to automatically re-order item(s) to be delivered to a customer based on electricity usage data received from a re-ordering device, as described above. FIG. 6 illustrates the process 600 as a collection of blocks in a logical flow diagram, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures and environments described in the examples herein, although the processes may be implemented in a wide variety of other architectures or environments.

At 602, the process 600 includes receiving electricity usage data from a re-ordering device of a customer. For example, referring to FIGS. 1 and 2, the analysis module 124 may receive the electricity usage data 112 from the re-ordering device 102.

In the particular embodiment illustrated in FIG. 6, the process 600 includes determining a type of appliance that is electrically connected to the re-ordering device based on the electricity usage data, at 604. For example, referring to FIGS. 1 and 2, the analysis module 124 may compare the electricity usage data 112 to a plurality of signatures 208 stored in the electrical signature database 130. In the example of FIG. 1, the appliance 104 is a washing machine. Accordingly, referring to FIG. 2, the analysis module 124 may determine that the electrical usage data 112 matches the first signature 210 and that the appliance type 228 is a washing machine. In alternative embodiments, the user may specify the appliance type. Further, in some cases, a default option may be to determine the type of appliance unless the system receives the information (e.g., from the user, from the appliance, or from the re-ordering device, among other alternatives).

At 606, the process 600 includes determining, based on order history information for the customer, an estimated remaining quantity of one or more items that are associated with the appliance type. For example, referring to FIG. 2, the customer module 126 may determine, based on the order history information 230, an estimated remaining quantity of the detergent 238 and the dryer sheets 240.

At 608, the process 600 includes comparing the estimated remaining quantity of item(s) to one or more thresholds. For example, referring to FIG. 2, the re-order module 128 may compare the estimated remaining quantity of the detergent 238 to a first threshold and may compare the estimated remaining quantity of the dryer sheets 240 to a second threshold.

At 610, the process 600 includes determining whether one or more thresholds are satisfied. When the threshold(s) are satisfied, the process 600 includes decrementing the estimated remaining quantity of item(s), at 612. For example, referring to FIG. 2, the re-order module 128 may determine that the estimated remaining quantity of the detergent 238 satisfies the first threshold and may decrement the estimated remaining quantity of detergent. As another example, referring to FIG. 2, the re-order module 128 may determine that the estimated remaining quantity of the dryer sheets 240 satisfies the second threshold and may decrement the estimated remaining quantity of dryer sheets.

When the threshold(s) are not satisfied, the process 600 includes generating order data for automated re-ordering of item(s) to be delivered to the customer, at 614. For example, referring to FIGS. 1 and 2, the re-order module 128 may generate the order data 138 for automated re-ordering of the item(s) 148 to be delivered to the customer.

As indicated above, the order in which the operations are described in the example of FIG. 6 should not be construed as a limitation. Any number of the described blocks can be combined in any order and/or in parallel to implement the process, or alternative processes, and not all of the blocks need be executed.

Figure 7:
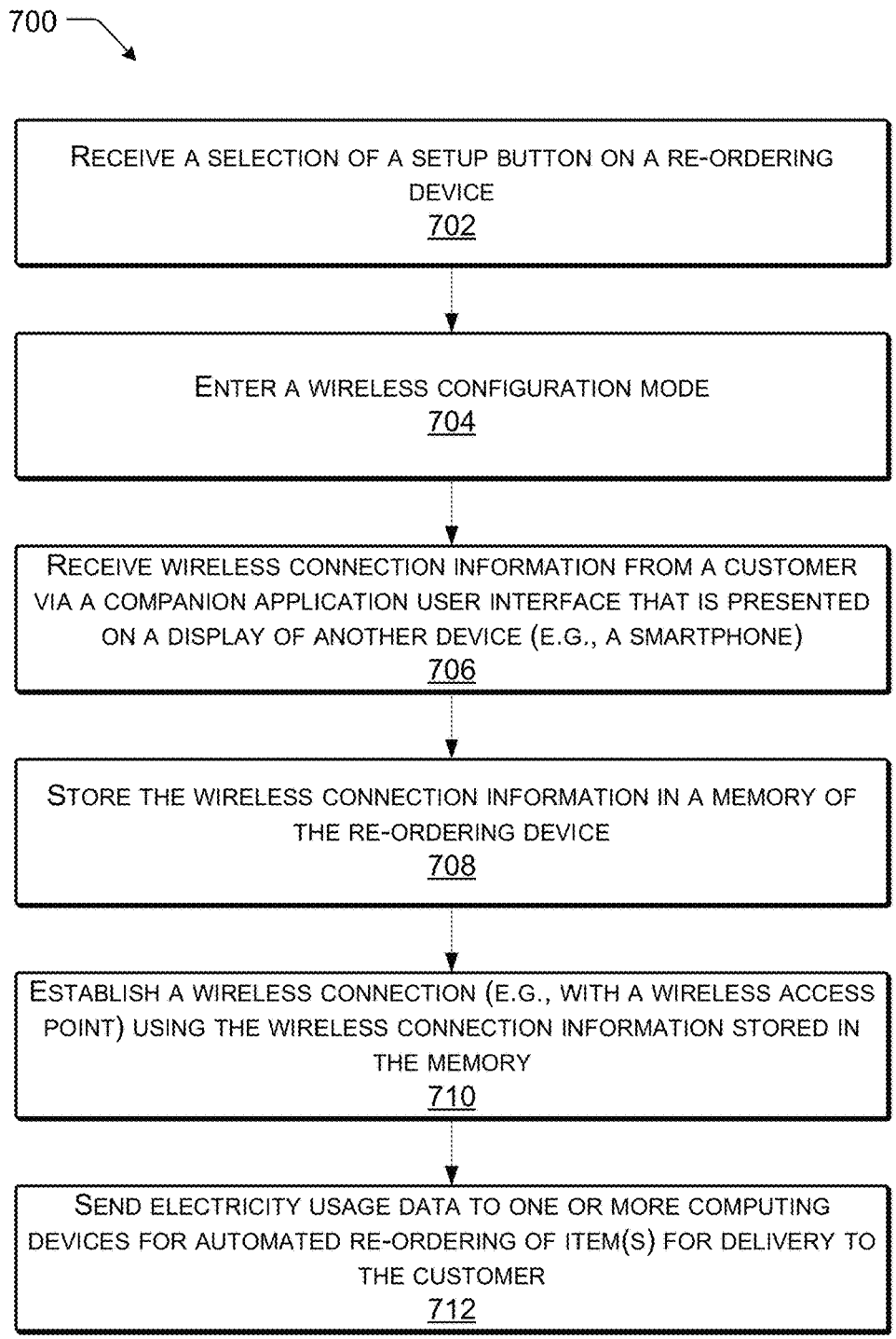
FIG. 7 illustrates an example process for providing communication data for storage in a memory of a re-ordering device using a companion user interface presented via a display of another electronic device, according to some implementations.

FIG. 7 illustrates an example process 700 for providing communication data for storage in a memory of a re-ordering device using a companion user interface presented via a display of another electronic device, as described above. FIG. 7 illustrates the process 700 as a collection of blocks in a logical flow diagram, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures and environments described in the examples herein, although the processes may be implemented in a wide variety of other architectures or environments.

In the particular embodiment illustrated in FIG. 7, the process 700 includes receiving a selection of a setup button on a re-ordering device, at 702. For example, referring to the embodiment of the re-ordering device 502 illustrated in FIG. 5, a user may select the setup button 508. The process 700 includes entering a wireless configuration mode, at 704. In alternative embodiments, the re-ordering device may enter the wireless configuration mode upon first use. For example, referring to the embodiments of the re-ordering device 102 illustrated in FIGS. 1-4, the re-ordering device 102 may enter the wireless configuration mode when plugged into the power outlet 106 for the first time.

At 706, the process 700 includes receiving wireless connection information from a customer. For example, the re-ordering device may not include an input device to allow the customer to provide wireless connection information such as an SSID and password. Accordingly, a companion application user interface may be presented on a display of another device (e.g., a smartphone), and the customer may provide the wireless connection information via the companion application user interface. For example, referring to FIG. 4, the companion application user interface 402 presented via the display of the electronic device 400 may allow the user 404 to select the SSID 328 and the (optional) password 330 associated with the WAP 118.

At 708, the process 700 includes storing the wireless connection information in a memory of the re-ordering device. For example, referring to FIG. 4, the electronic device 400 may wirelessly communicate the SSID 328 and the password 330 to the re-ordering device 102 (e.g., via the one or more communication interfaces 116) for storage in the memory 110.

At 710, the process 700 includes establishing a wireless connection (e.g., with a WAP) using the wireless connection information stored in the memory. At 712, the process 700 includes sending electricity usage data to one or more computing devices for automated re-ordering of one or more items for delivery to the customer. For example, referring to FIGS. 1 and 2, the re-ordering device 102 may send the electricity usage data 112 to the one or more computing devices 118.

As indicated above, the order in which the operations are described in the example of FIG. 7 should not be construed as a limitation. Any number of the described blocks can be combined in any order and/or in parallel to implement the process, or alternative processes, and not all of the blocks need be executed.

Figure 8:
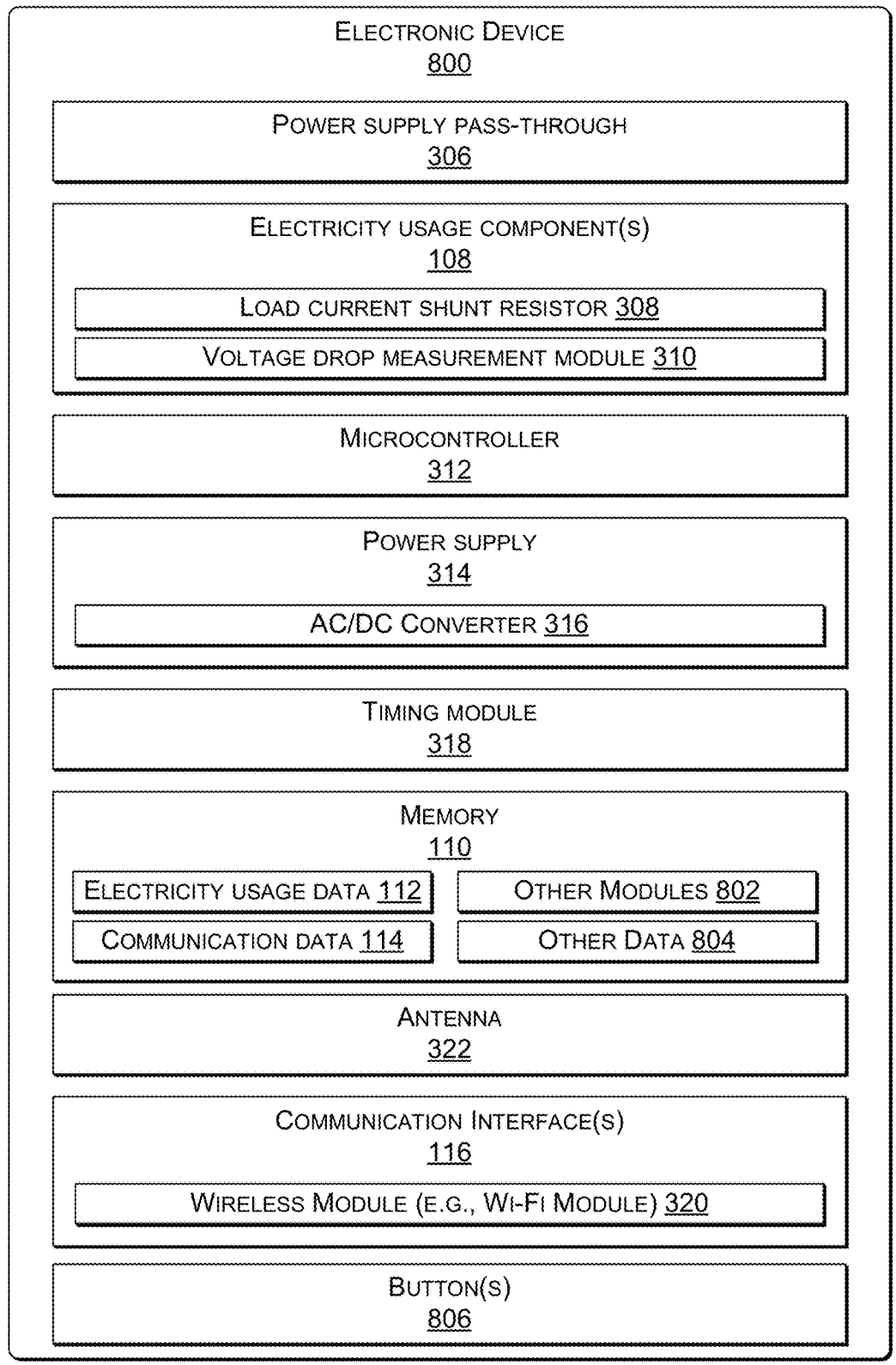
FIG. 8 illustrates select components of an example electronic device (e.g., a re-ordering device), according to some implementations.

FIG. 8 illustrates select example components of an electronic device 800 that may be used to implement at least a portion of the functionality described above according to some implementations. The electronic device 800 illustrated in FIG. 8 may correspond to the re-ordering device 102 of FIGS. 1-4 or may correspond to the re-ordering device 502 of FIG. 5. For example, the electronic device 800 may include the power supply pass-through 306 and one or more electricity usage components 108. In some cases, the electricity usage component(s) 108 may include the load current shunt resistor 308 and the voltage drop measurement module 310, as illustrated in the embodiments shown in FIGS. 3 and 5. Further, the electronic device 800 may include the power supply 314 and associated AC/DC converter 316, as well as the timing module 318 and the antenna 322, as illustrated in the embodiments shown in FIGS. 3 and 5.

In a very basic configuration, the electronic device 800 includes, or accesses, components such at least one processor (e.g., the microcontroller 312 of FIG. 3 or FIG. 5) and a memory (e.g., the memory 110 of FIGS. 1-5). Each processor may itself comprise one or more processors or cores. The processor(s) can be configured to fetch and execute computer-readable instructions stored in the memory 110 or other computer-readable media.

Depending on the configuration of the electronic device 800, the memory 110 may be an example of non-transitory computer storage media and may include volatile and non-volatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, including optical storage, solid state storage, magnetic disk storage, or any other medium that can be used to store information and which can be accessed by the microcontroller 312. Accordingly, the memory 110 may be computer-readable media able to maintain instructions, modules or components executable by the microcontroller 312.

The memory 110 may be used to store any number of functional components that are executable by the microcontroller 312. In some implementations, these functional components comprise instructions or programs that are executable by the microcontroller 312 and that, when executed, implement operational logic for performing the actions attributed above to the electronic device 800. Functional components of the electronic device 800 stored in the memory 110 may include one or more components for controlling and managing various functions of the electronic device 800. Depending on the type of the electronic device 800, the memory 110 may also optionally include other functional components, such as other modules 802, which may include applications, programs, drivers and so forth.

The memory 110 may also store data, data structures, and the like that are used by the functional components. For example, data stored by the memory 110 may include the electricity usage data 112. The electricity usage data 112 may include at least one or more times associated with electricity usage and at least basic information associated with electricity usage at a particular time (e.g., an "on" or an "off" indication or more granular information such as a measured voltage drop). Further, data stored in the memory 110 may include the communication data 114. In some cases, the communication data 114 may include the SSID 328 associated with the WAP 118, the (optional) password 330 associated with the WAP 118, and identifier(s) 332 such as a customer account identifier and/or a device identifier.

The electronic device 800 may also include other data 804, which may include, for example, data used by the control logic and the other modules 802. Further, the electronic device 800 may include many other logical, programmatic and physical components, of which those described are merely examples that are related to the discussion herein. While not shown in FIG. 8, in some cases, the electronic device 800 may include a display, which may be passive, emissive or any other form of display. For example, the display may be an active display such as a liquid crystal display, plasma display, light emitting diode display, organic light emitting diode display, and so forth.

In some embodiments, the one or more communication interfaces 116 may support at least a wireless connection to various networks, such as a WiFi network. As shown in the example of FIG. 8, the communication interface(s) 116 may include at least a wireless module 320 (e.g., a Wi-Fi module). Further, in some cases, the communication interface(s) 116 may support both wired and wireless connections to various networks, such as cellular networks, radio, WiFi networks, short-range or near-field networks (e.g., Bluetooth®), infrared signals, local area networks, wide area networks, the Internet, and so forth. In some cases, the communication interface(s) 116 may further provide access to storage on another device, such as a user's computing device, a network attached storage device, or the like.

The electronic device 800 may further be equipped with various input/output (I/O) components. For example, the control logic of the electronic device 800 may include suitable drivers configured to accept input from a keypad, keyboard, or other user actuatable controls and devices included as the I/O components. For instance, the user actuatable controls may include one or more buttons 806. To illustrate, the one or more buttons 806 may correspond to the setup button 508 illustrated in the example of FIG. 5. Further, the electronic device 800 may include other I/O components, such as navigational keys, a power on/off button, selection keys, and so on. Other examples may include a touchscreen and various user actuatable controls (e.g., buttons, a keyboard, etc.), connection ports, and so forth. Additionally, the electronic device 800 may include various other components that are not shown, examples of which include removable storage, a global positioning system (GPS) device, a PC Card component, and so forth.

Figure 9:
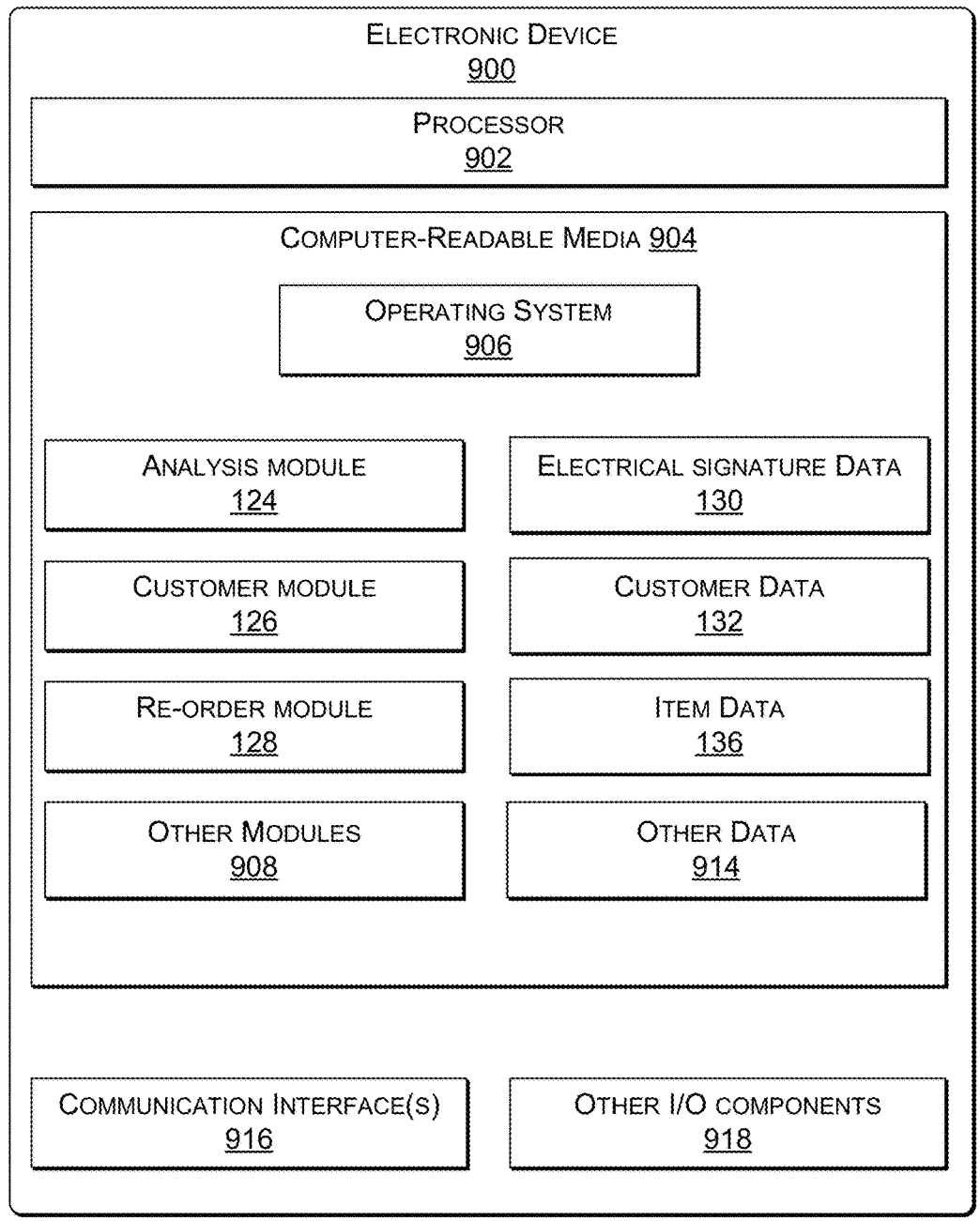
FIG. 9 illustrates select components of an example electronic device (e.g., a computing device associated with a delivery service), according to some implementations.

FIG. 9 illustrates select example components of an electronic device 900 that may be used to implement select portions of the functionality described above, according to some implementations. The electronic device 900 illustrated in FIG. 9 may correspond to the one or more (remote) computing devices 122 illustrated in FIGS. 1 and 5. In a very basic configuration, the electronic device 900 includes, or accesses, components such as at least one processor 902 and a computer-readable media 904. Each processor 902 may itself comprise one or more processors or cores. The processor(s) 902 can be configured to fetch and execute computer-readable instructions stored in the computer-readable media 904 or other computer-readable media.

Depending on the configuration of the electronic device 900, the computer-readable media 904 may be an example of non-transitory computer storage media and may include volatile and nonvolatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 902 directly or through another computing device. Accordingly, the computer-readable media 904 may be computer-readable media able to maintain instructions, modules or components executable by the processor 902.

The computer-readable media 904 may be used to store any number of functional components that are executable by the processor 902. In some implementations, these functional components comprise instructions or programs that are executable by the processor 902 and that, when executed, implement operational logic for performing the actions attributed above to the electronic device 900. Functional components of the electronic device 900 stored in the computer-readable media 904 may include the analysis module 124, the customer module 126, and the re-order module 128, as described above, which may be executed on the processor 902. Other functional components may include an operating system 906 for controlling and managing various functions of the electronic device 900. Depending on the type of the electronic device 900, the computer-readable media 904 may also optionally include other functional components, such as other modules 908, which may include applications, programs, drivers and so forth.

The computer-readable media 904 may also store data, data structures, and the like that are used by the functional components. For example, data stored by the computer-readable media 904 may include the electrical signature data 130 (e.g., the electrical signature DB 130 illustrated in FIGS.

1 and 2), the customer data 132 (e.g., the customer DB 132 illustrated in FIGS. 1 and 2), and the item data 136 (e.g., the item DB 136 illustrated in FIGS. 1 and 2), as described above. The electronic device 900 may also include other data 914, which may include, for example, data used by the operating system 906 and the other modules 908. Further, the electronic device 900 may include many other logical, programmatic and physical components, of which those described are merely examples that are related to the discussion herein.

One or more communication interfaces 916 may support both wired and wireless connection to various networks, such as cellular networks, radio, WiFi networks, short-range or near-field networks (e.g., Bluetooth®), infrared signals, local area networks, wide area networks, the Internet, and so forth. The electronic device 900 may further be equipped with various other input/output (I/O) components 918. Additionally, the electronic device 900 may include various other components that are not shown.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

What is claimed is:

1. A first device comprising:
   a socket to receive a power cord plug of a second device;
   an electrical connection component operable to couple to a power source;
   at least one electricity usage component;
   a wireless component; and
   computer-executable instructions that, when executed, cause the first device to:
      determine electricity usage data of the second device based at least partly on at least one of voltage or current;
      establish a wireless connection with a wireless access point (WAP) via the wireless component; and
      send the electricity usage data to one or more remote devices via the WAP, the electricity usage indicating consumption of an amount of an item associated with usage of the second device and a device type of the second device, the electricity usage data causing the one or more remote devices to:
         determine the device type by comparing the electricity usage data to an electrical signature associated with the device type, and
         initiate an order of the item based at least partly on the amount of the item and the device type.

2. The first device as recited in claim 1, wherein the computer-executable instructions, when executed, further cause the first device to determine that the electricity usage data indicates a voltage signal.

3. The first device as recited in claim 1, wherein the computer-executable instructions, when executed, further cause the first device to determine that the electricity usage data indicates a remaining amount of the item.

4. The first device as recited in claim 1, wherein the computer-executable instructions, when executed, further cause the first device to determine a timing signal indicating a time of a change in voltage associated with the second device, and wherein the electricity usage data further indicates the time of the change in voltage.

5. The first device as recited in claim 1, wherein the computer-executable instructions, when executed, further cause the first device to:
   determine a first change in voltage that is indicative of the second device being powered on; and
   determine a second change in voltage that is indicative of the second device being powered off;
      wherein the electricity usage data further indicates the first change in voltage and the second change in voltage.

6. The first device as recited in claim 1, wherein the computer-executable instructions, when executed, further cause the first device to present a representation of the electricity usage data on a display.

7. The first device as recited in claim 1, wherein the computer-executable instructions, when executed, further cause the first device to determine the voltage or the current via a shunt resistor or a hall effect sensor.

8. A method comprising:
   receiving, at first device, a power cord plug of a second device;
   determining, by the first device, electricity usage data of the second device based at least partly on at least one of voltage or current;
   establishing, by the first device, a wireless connection with a wireless access point (WAP); and
   sending, from the first device, the electricity usage data to one or more remote devices via the WAP, the electricity usage data indicating consumption of an amount of an item associated with the second device and causing the one or more remote devices to:
      initiate an order of the item based at least partly on the amount of the item and a device type of the second device, and
      determine the device type by comparing the electricity usage data to an electrical signature associated with the device type.

9. The method as recited in claim 8, wherein the electricity usage data comprises a voltage signal having a first section followed by a second section that is different than the first section.

10. The method as recited in claim 8, further comprising determining that the electricity usage data indicates a remaining amount of the item.

11. The method as recited in claim 8, further comprising determining the voltage or the current via a shunt resistor or a hall effect sensor.

12. The method as recited in claim 8, further comprising receiving, from a timing component, a timing signal associated with the electricity usage data.

13. The method as recited in claim 8, wherein the electricity usage data further causes the one or more remote devices to schedule delivery of the item.

14. A wall outlet comprising:
- a socket to receive a power cord plug of a device;
- an electrical connection component operable to couple to an alternating current power source;
- at least one electricity usage component;
- a wireless component; and
- computer-executable instructions that, when executed, cause the wall outlet to:
  - determine electricity usage data of the device based at least partly on at least one of voltage or current;
  - establish a wireless connection with a wireless access point (WAP) via the wireless component; and
  - send the electricity usage data to one or more remote devices via the WAP, the electricity usage data indicating consumption of an amount of an item associated with usage of the device, the electricity usage data causing the one or more remote devices to:
    - initiate an order of the item based at least partly on the amount of the item and a device type of the first device, and
    - determine the device type by comparing the electricity usage data to an electrical signature associated with the device type.

15. The wall outlet as recited in claim 14, wherein the electricity usage data further causes the one or more remote devices to schedule delivery of the item.

16. The wall outlet as recited in claim 14, wherein the computer-executable instructions, when executed, further cause the wall outlet to determine a timing signal indicating a time of a change in voltage associated with the first device, and wherein the electricity usage data further indicates the time of the change in voltage.

17. The wall outlet as recited in claim 14, wherein the computer-executable instructions, when executed, further cause the wall outlet to determine that the electricity usage data indicates a remaining amount of the item.

18. The wall outlet as recited in claim 14, wherein the computer-executable instructions, when executed, further cause the wall outlet to determine that the electricity usage data indicates a voltage signal.

19. The wall outlet as recited in claim 14, wherein the computer-executable instructions, when executed, further cause the wall outlet to determine the voltage or the current via a shunt resistor or a hall effect sensor.

20. The wall outlet as recited in claim 14, wherein the computer-executable instructions, when executed, further cause the wall outlet to:
- determine a first change in voltage that is indicative of the first device being powered on; and
- determine a second change in voltage that is indicative of the first device being powered off;
  - wherein the electricity usage data further indicates the first change in voltage and the second change in voltage.

* * * * *